United States Patent
Lopez

(10) Patent No.: US 9,103,735 B1
(45) Date of Patent: Aug. 11, 2015

(54) FISHING REEL DRAG INDICATOR SYSTEM

(71) Applicant: David J. Lopez, Tarpon Springs, FL (US)

(72) Inventor: David J. Lopez, Tarpon Springs, FL (US)

( * ) Notice: Subject to any disclaimer, the term of this patent is extended or adjusted under 35 U.S.C. 154(b) by 346 days.

(21) Appl. No.: 13/800,649

(22) Filed: Mar. 13, 2013

(51) Int. Cl.
| | |
|---|---|
| *A01K 89/015* | (2006.01) |
| *G01L 5/04* | (2006.01) |
| *A01K 89/00* | (2006.01) |
| *A01K 89/01* | (2006.01) |
| *G09F 9/00* | (2006.01) |

(52) U.S. Cl.
CPC ............... *G01L 5/047* (2013.01); *A01K 89/00* (2013.01); *A01K 89/01* (2013.01); *A01K 89/015* (2013.01); *G09F 9/00* (2013.01)

(58) Field of Classification Search
CPC ..... A01K 89/00; A01K 89/01; A01K 89/015; G09F 9/00; G01L 5/047
USPC .......... 116/278, 307, 309, 322; 242/223–224, 242/244–246
See application file for complete search history.

(56) References Cited

U.S. PATENT DOCUMENTS

| | | | | |
|---|---|---|---|---|
| 2,279,434 | A * | 4/1942 | Balz ............................. | 242/290 |
| 3,630,166 | A * | 12/1971 | Riddle et al. ................ | 116/67 R |
| 4,261,528 | A * | 4/1981 | McKinney ................... | 242/323 |
| 4,804,150 | A | 2/1989 | Takeuchi | |
| 4,840,327 | A | 6/1989 | Kaneko | |
| 5,096,138 | A * | 3/1992 | L'Host et al. ................ | 242/245 |
| 5,219,131 | A | 6/1993 | Furomoto | |
| 5,236,147 | A * | 8/1993 | Kaneko ........................ | 242/223 |
| 5,370,329 | A | 12/1994 | Kono | |
| 5,568,787 | A * | 10/1996 | Forslund ....................... | 116/307 |
| 5,901,913 | A * | 5/1999 | Yamaguchi et al. .......... | 242/268 |
| 5,924,639 | A * | 7/1999 | Atherton ....................... | 242/322 |
| 6,412,722 | B1 * | 7/2002 | Kreuser et al. ............... | 242/288 |
| 6,658,783 | B1 | 12/2003 | Yamanaka | |
| 7,357,343 | B2 | 4/2008 | Hoag et al. | |
| D635,637 | S | 4/2011 | Pekin et al. | |
| 8,602,343 | B2 * | 12/2013 | Strohecker et al. .......... | 242/288 |
| 2007/0200023 | A1 * | 8/2007 | Konishi ....................... | 242/402 |
| 2011/0213570 | A1 | 9/2011 | Rayor et al. | |
| 2011/0259988 | A1 | 10/2011 | Strohecker et al. | |

* cited by examiner

*Primary Examiner* — R. A. Smith
*Assistant Examiner* — Tania Courson

(57) ABSTRACT

A fishing reel drag indicator system for numerical quantification of tension applied to fishing line on fishing reels equipped with a drag system features a drag indicator cap having a notch located on a side of an anterior end. A round indicator window is centrally located on a second flat notch side. A cylindrical recess is centrally located on a planar posterior end and an annular channel is centrally located on a recess floor. A gauge spring is located in the annular channel. A top edge of the tension indicator is located against the gauge spring in the annular channel. A main spring is located in the cylindrical recess against a bottom surface of the tension indicator. A bottom plate is located on the posterior end against the main spring. The threaded channel is adapted to screw onto a threaded rod located on the fishing reel anterior end.

2 Claims, 9 Drawing Sheets

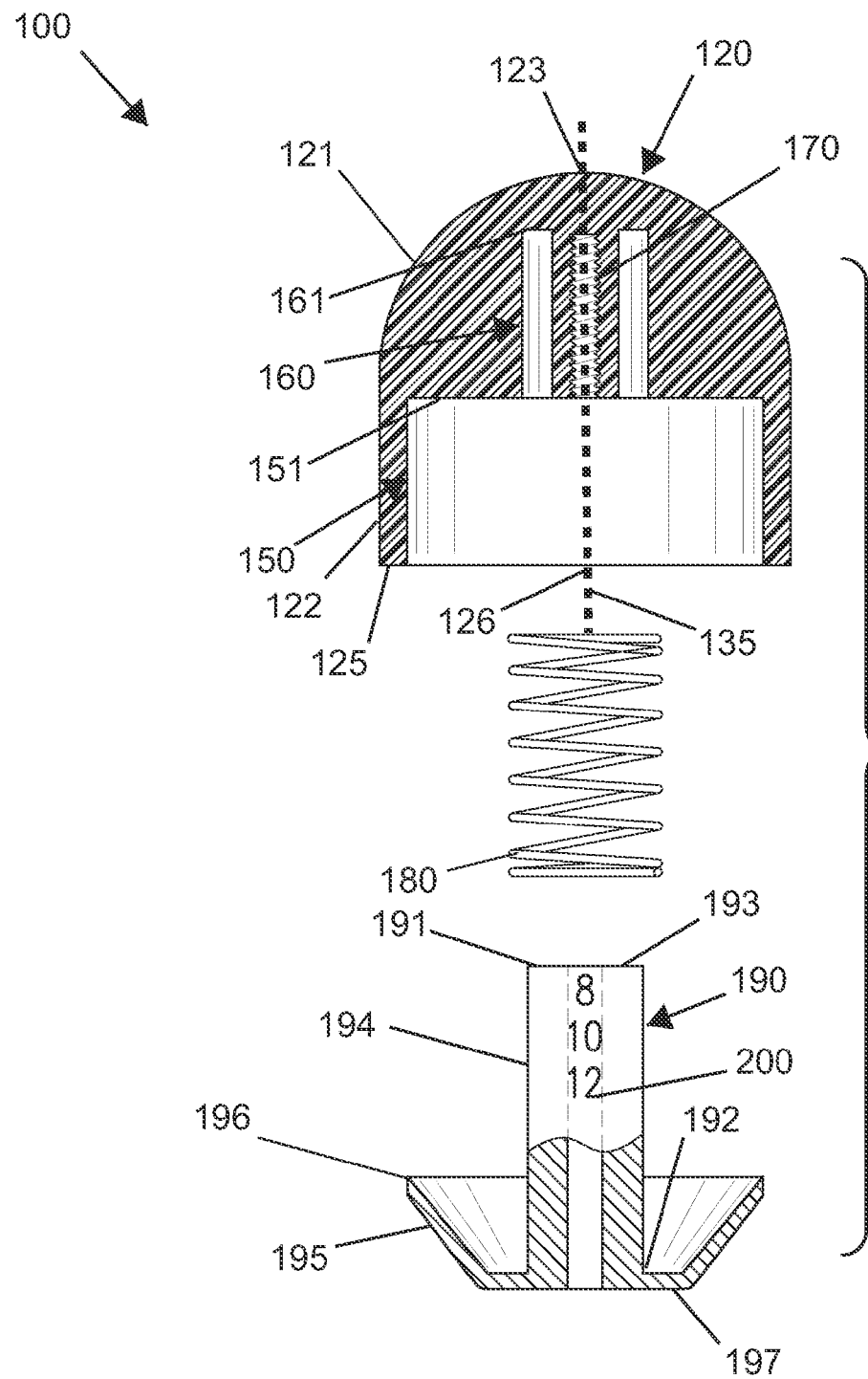

(SHOWN IN MIN DRAG LOCATION)

(SHOWN IN MAX DRAG LOCATION)

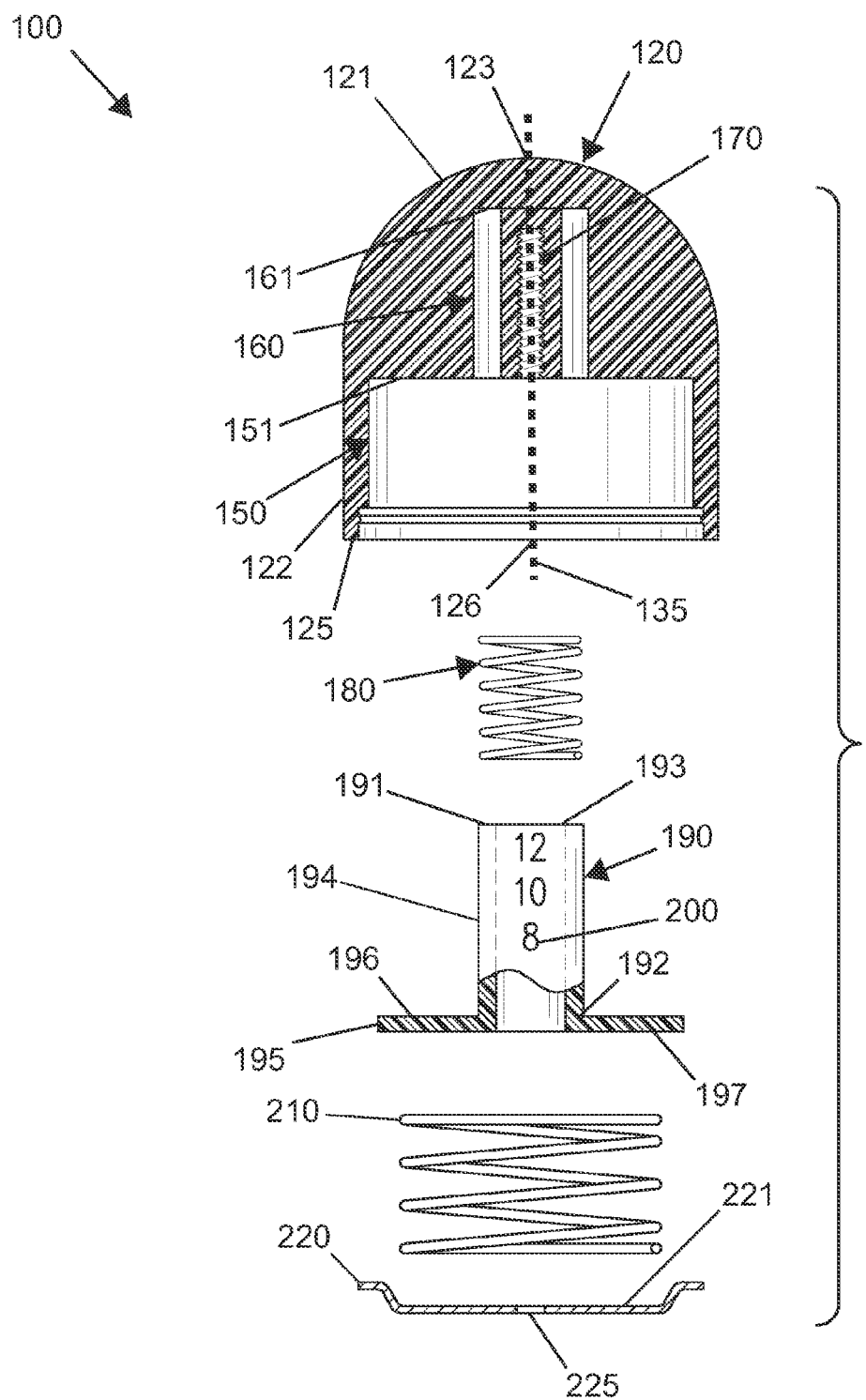

(SHOWN IN MIN DRAG LOCATION)

(SHOWN IN MAX DRAG LOCATION)

(SHOWN IN MIN DRAG LOCATION)

(SHOWN IN MAX DRAG LOCATION)

FISHING REEL DRAG INDICATOR SYSTEM

FIELD OF THE INVENTION

The present invention relates to fishing equipment, or more specifically fishing reel drag systems.

BACKGROUND OF THE INVENTION

Fishing reels have been used on fishing poles for many years. A drag system on a fishing reel is a means of applying pressure to the turning spool in order to act as a friction brake. It is used as an aid for a fisherman when a fish is tugging on the line. The present invention features a fishing reel drag indicator system for numerical quantification of tension applied to fishing line on fishing reels equipped with a drag system.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a fishing reel drag indicator system for numerical quantification of tension applied to fishing line on fishing reels equipped with a drag system. In some embodiments, the fishing reel drag indicator system comprises a drag indicator cap having a notch located on a side of an anterior end. In some embodiments, a round indicator window is centrally located on a second flat notch side.

In some embodiments, a cylindrical recess is centrally located on a planar posterior end and an annular channel is centrally located on a recess floor. In some embodiments, a gauge spring is located in the annular channel. In some embodiments, a top edge of the tension indicator is located against the gauge spring in the annular channel. In some embodiments, a main spring is located in the cylindrical recess against a bottom surface of the tension indicator. In some embodiments, a bottom plate is located on the posterior end against the main spring.

In some embodiments, the threaded channel is adapted to screw onto a threaded rod located on the fishing reel anterior end. In some embodiments, upon rotation of the drag indicator cap, the drag system is adjusted to a desired level of tension, quantified by numbers on the tension indicator.

BRIEF DESCRIPTION OF THE DRAWINGS

FIG. 3 shows a cross-sectional, exploded view in a sagittal plane of a fishing reel drag indicator system.

FIG. 7 shows a cross-sectional, exploded view in a sagittal plane of an alternate embodiment of a fishing reel drag indicator system.

DESCRIPTION OF PREFERRED EMBODIMENTS

Figure 1:
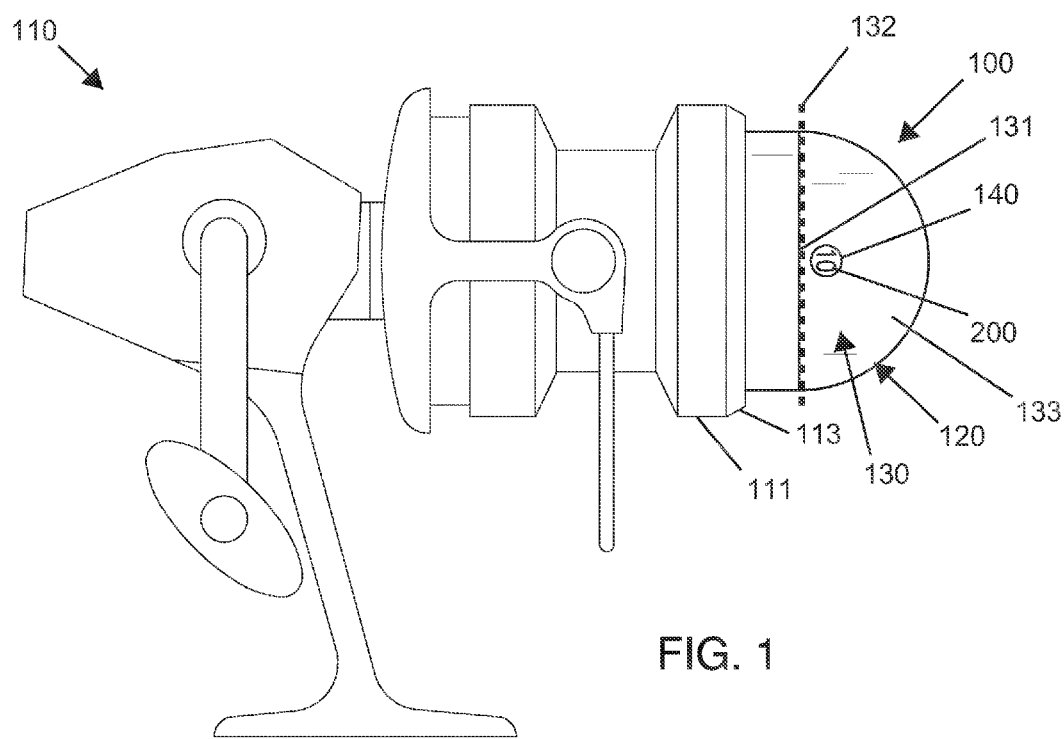
FIG. 1 shows a side view of a fishing reel equipped with a fishing reel drag indicator system.
Figure 2:
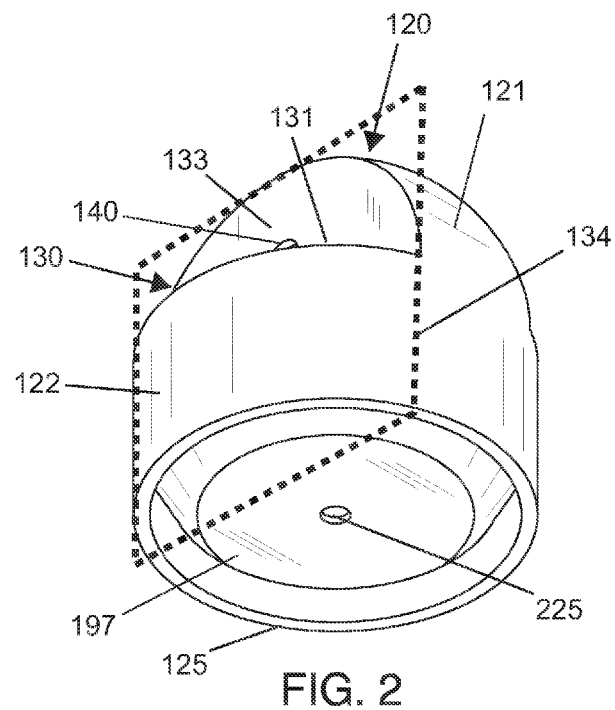
FIG. 2 shows a perspective view of a fishing reel drag indicator system.
Figure 4A:
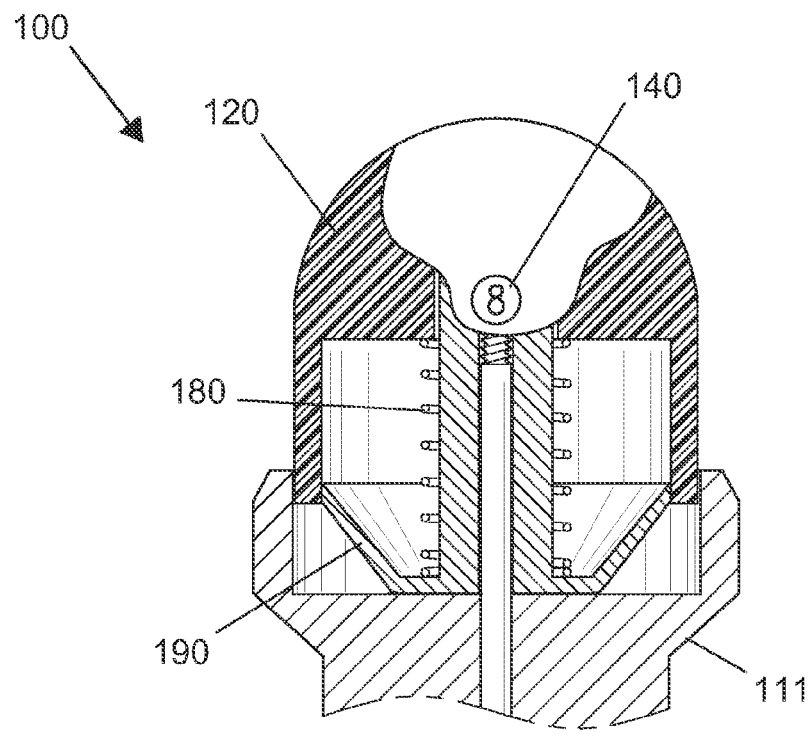
FIG. 4A shows a cross-sectional view in a sagittal plane of a fishing reel drag indicator system in minimum drag position.
Figure 4B:
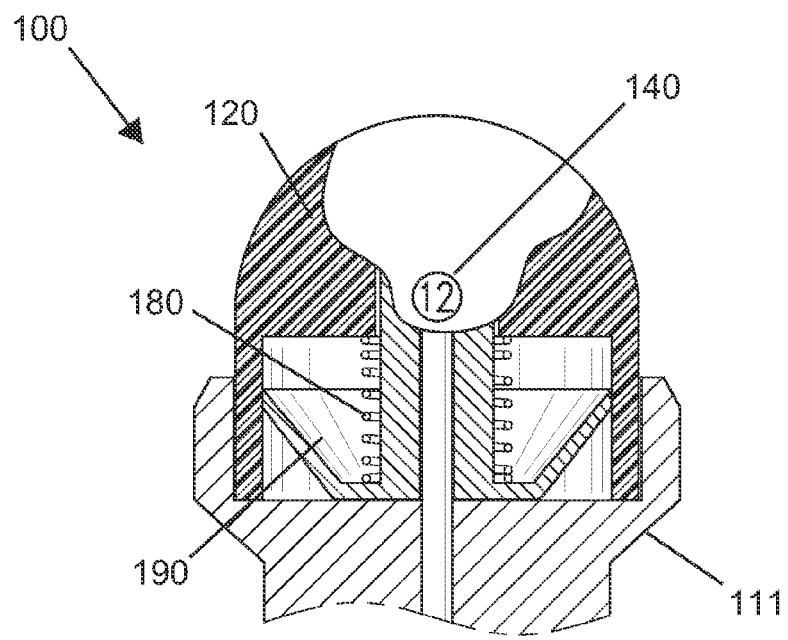
FIG. 4B shows a cross-sectional view in a sagittal plane of a fishing reel drag indicator system in maximum drag position.

Following is a list of elements corresponding to a particular element referred to herein:
- 100 Fishing reel drag indicator system
- 110 Fishing reel
- 111 Fishing reel anterior end
- 113 Fishing reel spool anterior end
- 120 Drag indicator cap
- 121 Cap anterior end
- 122 Cap side
- 123 Cap anterior end center point
- 125 Cap posterior end
- 126 Cap posterior end center point
- 130 Notch
- 131 First flat notch side
- 132 First plane
- 133 Second flat notch side
- 134 Second plane
- 135 Central axis
- 140 Indicator window
- 150 Cylindrical recess
- 151 Recess floor
- 160 Annular channel
- 161 Annular channel bottom
- 170 Threaded channel
- 180 Gauge spring
- 190 Tension indicator
- 191 Annular projection
- 192 Annular projection bottom edge
- 193 Annular projection top edge
- 194 Annular projection side wall
- 195 Round disk
- 196 Round disk top surface
- 197 Round disk bottom surface
- 200 Quantifying number
- 210 Main spring
- 220 Bottom plate
- 221 Bottom plate top surface
- 225 Aperture
- 300 Annular recess
- 301 Annular recess floor 310 Cylindrical channel
311 Cylindrical channel bottom
320 Cylindrical projection
321 Cylindrical projection bottom edge
322 Cylindrical projection top edge
323 Cylindrical projection side wall
330 Annular fishing spool recess
340 Threaded rod
350 Third plane Referring now to FIG. 1-4B, the present invention features a fishing reel drag indicator system (100) for numerical quantification of tension applied to fishing line on fishing reels equipped with a drag system. In some embodiments, the fishing reel drag indicator system (100) comprises a drag indicator cap (120) having a hemispherical cap anterior end (121) and a planar cap posterior end (125). In some embodiments, a notch (130) is located on a cap side (122) of the cap anterior end (121). In some embodiments, the notch (130) comprises a first flat notch side (131) located on a first plane (132) parallel with the cap posterior end (125). In some embodiments, the notch (130) comprises a second flat notch side (133) located on a second plane (134) perpendicular to the first flat notch side (131). In some embodiments, the notch (130) does not intersect a central axis (135) located through the drag indicator cap (120) from a cap anterior end center point (123) to a cap posterior end center point (126). In some embodiments, a round indicator window (140) is centrally located on the second flat notch side (133). In some embodiments, a cylindrical recess (150) having a recess floor (151) is centrally located on the planar cap posterior end (125). In some embodiments, an annular channel (160) is centrally located on the recess floor (151). In some embodiments, the round indicator window (140) is fluidly connected to the annular channel (160). In some embodiments, a threaded channel (170) is centrally located on the recess floor (151).

In some embodiments, the system (100) comprises a tension indicator (190) having an annular projection (191) centrally located on a concave round disk (195). In some embodiments, an outer edge of a round disk top surface (196) is located against and interfaces with the recess floor (151). In some embodiments, the annular projection (191) is slidably received into the annular channel (160). In some embodiments, a series of quantifying numbers (200) is located on an annular projection side wall (194). In some embodiments, at least one of the series of quantifying numbers (200) is viewable through the round indicator window (140).

In some embodiments, the system (100) comprises a gauge spring (180) located in the cylindrical recess (150). In some embodiments, the gauge spring is located against and interfaces with the recess floor (151). In some embodiments, the gauge spring (180) is slidably located over the annular projection (191). In some embodiments, the gauge spring (180) is located against and interfaces with a round disk bottom surface (197).

In some embodiments, the fishing reel drag indicator system (100) for numerical quantification of tension applied to fishing line on fishing reels (110) equipped with the drag system is located on a fishing reel spool anterior end (113). In some embodiments, the threaded channel (170) is adapted to screw onto a threaded rod (340) located on a fishing reel anterior end (111). In some embodiments, upon rotation of the drag indicator cap (120), the drag system is adjusted to a desired level of tension, visually indicated and quantified by the tension indicator (190).

tification of tension applied to fishing line on fishing reels (110) equipped with a drag system. In some embodiments, the fishing reel drag indicator system (100) comprises a drag indicator cap (120) having a hemispherical cap anterior end (121) and a planar cap posterior end (125).

In some embodiments, a notch (130) is located on a cap side (122) of the cap anterior end (121). In some embodiments, the notch (130) comprises a first flat notch side (131) located on a first plane (132) parallel with the cap posterior end (125). In some embodiments, the notch (130) comprises a second flat notch side (133) located on a second plane (134) perpendicular to the first flat notch side (131) and the first plane (132). In some embodiments, the notch (130) does not intersect a central axis (135) located through the drag indicator cap (120) from a cap anterior end center point (123) to a cap posterior end center point (126). In some embodiments, a round indicator window (140) is centrally located on the second flat notch side (133).

In some embodiments, a cylindrical recess (150) having a recess floor (151) is centrally located on the planar cap posterior end (125). In some embodiments, an annular channel (160) is centrally located on the recess floor (151). In some embodiments, the round indicator window (140) is fluidly connected to the annular channel (160). In some embodiments, a threaded channel (170) is centrally located on the recess floor (151).

In some embodiments, the system (100) comprises a gauge spring (180) located in the annular channel (160). In some embodiments, the gauge spring (180) is located against and interfaces with an annular channel bottom (161).

In some embodiments, the system (100) comprises a tension indicator (190) having an annular projection (191) centrally located on a round disk (195). In some embodiments, an annular projection top edge (193) is located against and interfaces with the gauge spring (180) in the annular channel (160). In some embodiments, a round disk top surface (196) is located against and interfaces with the recess floor (151).

In some embodiments, a series of quantifying numbers (200) is located on an annular projection side wall (194). In some embodiments, at least one of the series of quantifying numbers (200) is viewable through the round indicator window (140).

In some embodiments, the system (100) comprises a main spring (210). In some embodiments, the main spring (210) is located in the cylindrical recess (150). In some embodiments, the main spring (210) is located against and interfaces with a round disk bottom surface (197).

In some embodiments, the system (100) comprises a bottom plate (220) having an aperture (225) centrally located therein. In some embodiments, the bottom plate (220) is located on the cap posterior end (125). In some embodiments, a bottom plate top surface (221) is located against and interfaces with the main spring (210).

In some embodiments, the fishing reel drag indicator system (100) for numerical quantification of tension applied to fishing line on fishing reels (110) equipped with a drag system is located on a fishing reel spool anterior end (113). In some embodiments, the threaded channel (170) is adapted to screw onto a threaded rod (340) located on the fishing reel anterior end (111). In some embodiments, the threaded rod (340) passes through the aperture (225).

In some embodiments, upon rotation of the drag indicator cap (120), the drag system is adjusted to a desired level of tension, visually indicated and quantified by the tension indicator (190).

Alternate Embodiment 1

Figure 5:
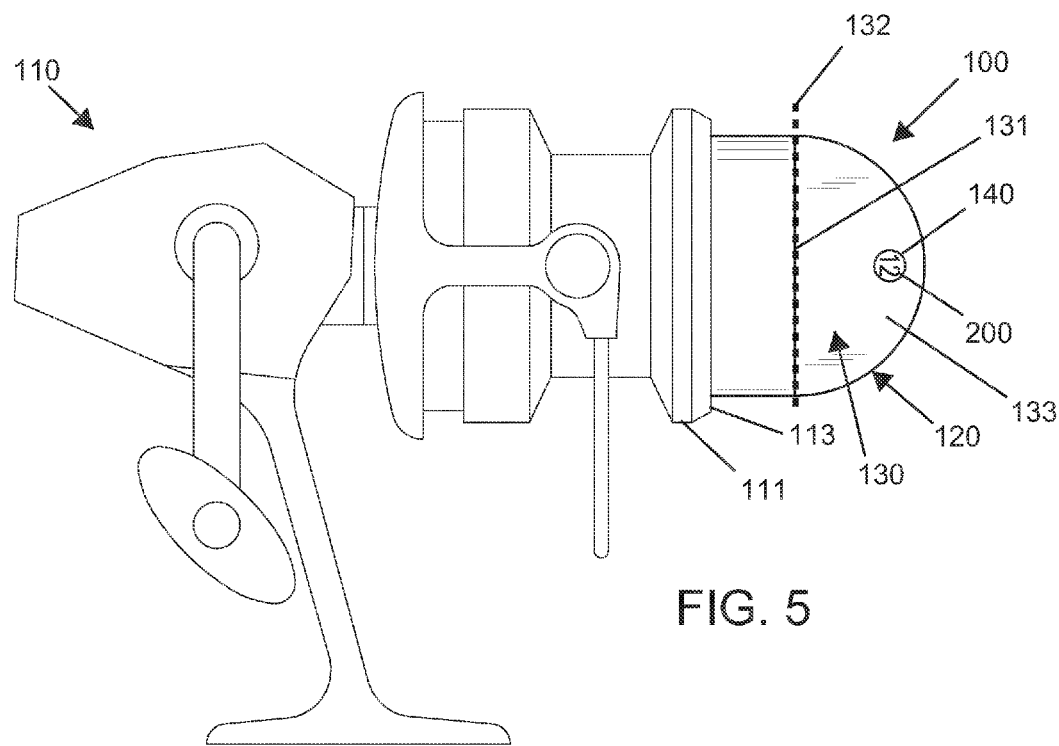
FIG. 5 shows a side view of a fishing reel equipped with an alternate embodiment of a fishing reel drag indicator system.
Figure 6:
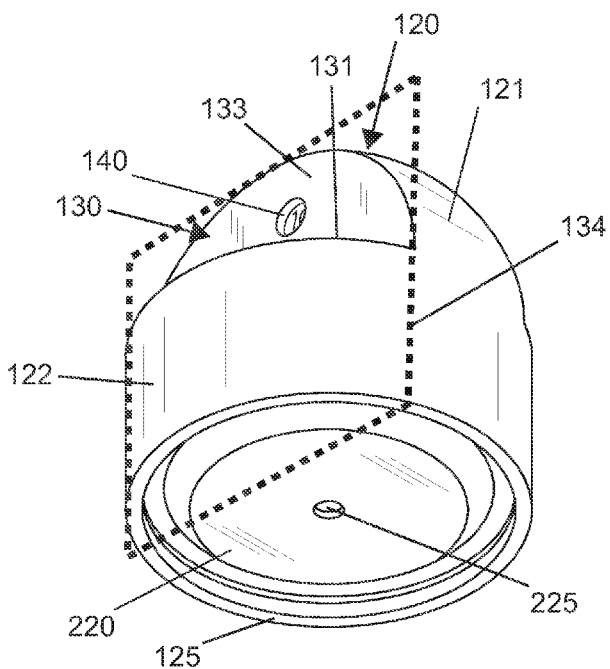
FIG. 6 shows a perspective view of an alternate embodiment of a fishing reel drag indicator system.
Figure 8A:
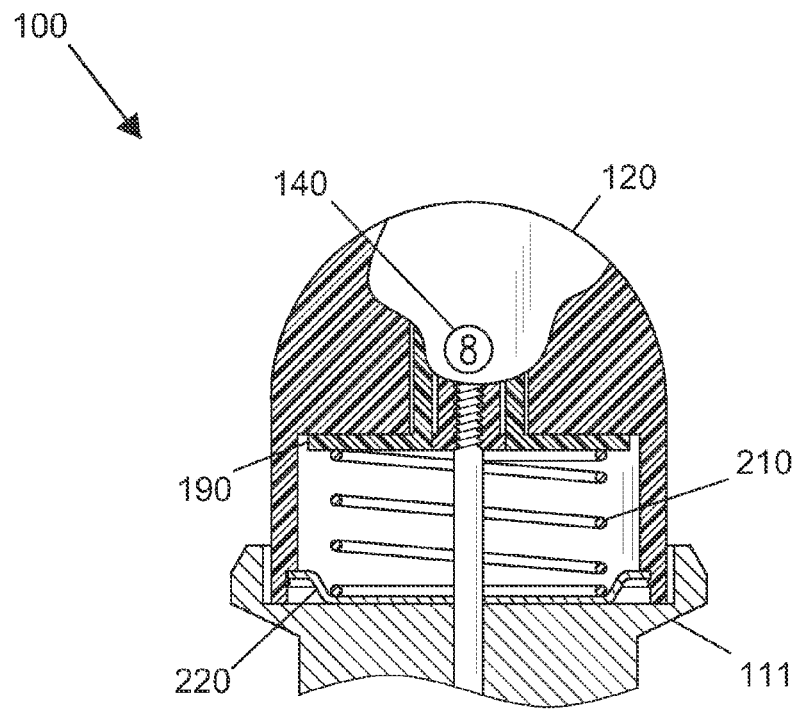
FIG. 8A shows a cross-sectional view in a sagittal plane of an alternate embodiment of a fishing reel drag indicator system in minimum drag position.
Figure 8B:
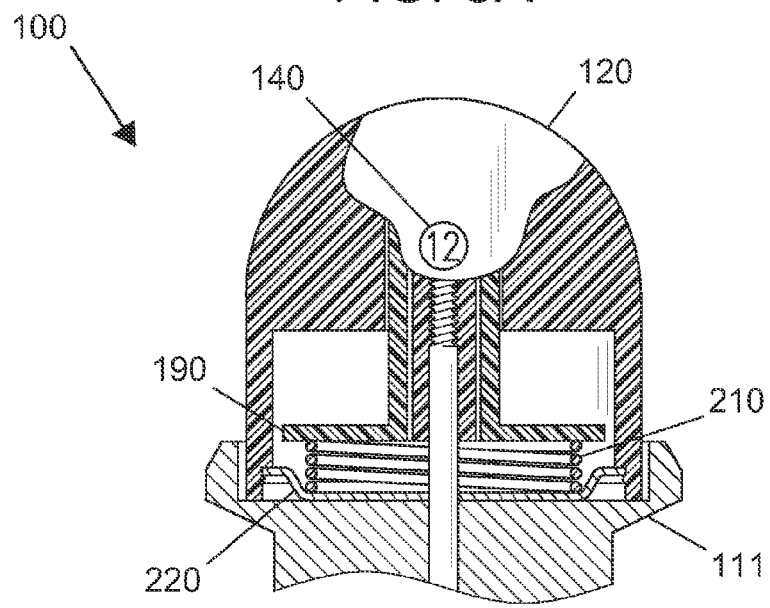
FIG. 8B shows a cross-sectional view in a sagittal plane of an alternate embodiment of a fishing reel drag indicator system in maximum drag position.

Referring now to FIG. 5-8B, the present invention features a fishing reel drag indicator system (100) for numerical quan- Alternate Embodiment 2

Figure 9:
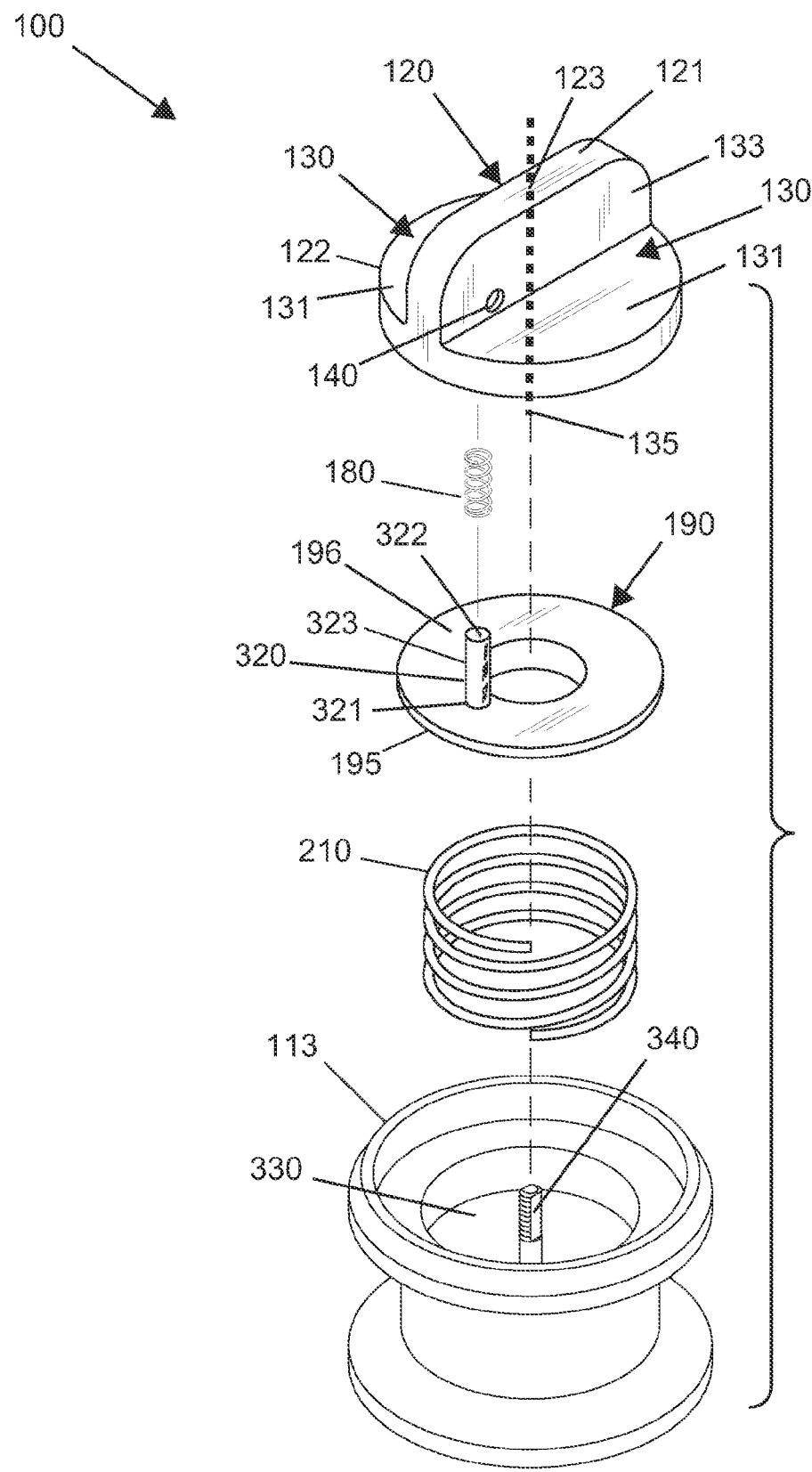
FIG. 9 shows a perspective, exploded view of an alternate embodiment of a fishing reel drag indicator system.
Figure 10:
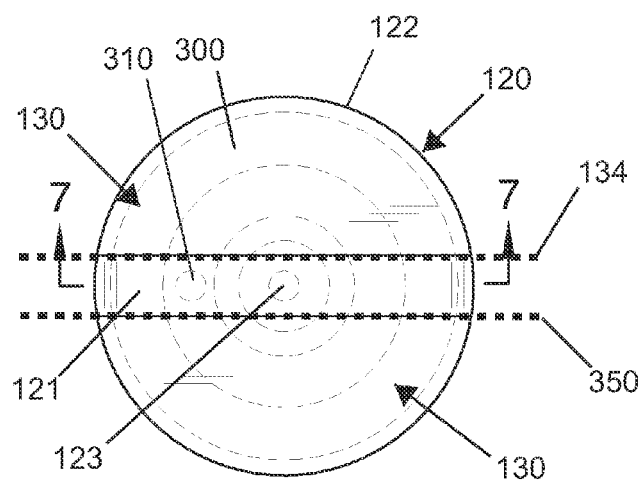
FIG. 10 shows a top view of an alternate embodiment of a fishing reel drag indicator system.
Figure 11:
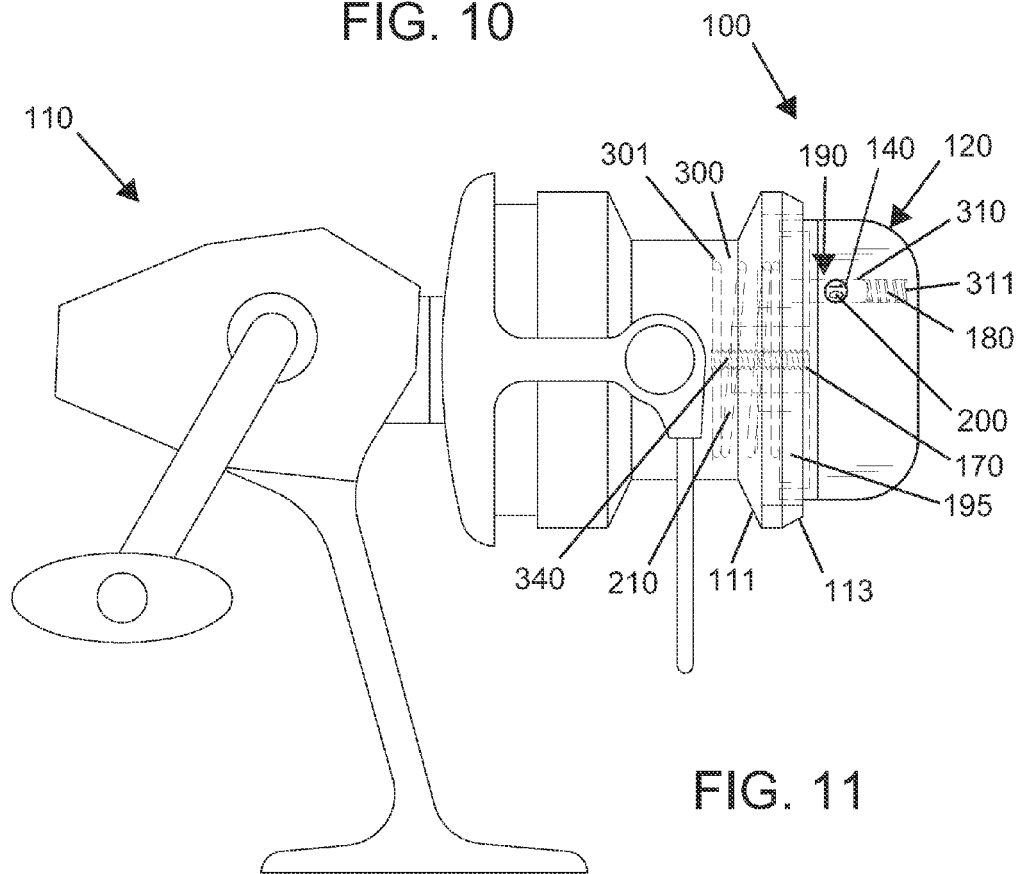
FIG. 11 shows a side view of a fishing reel equipped with an alternate embodiment of a fishing reel drag indicator system.
Figure 12A:
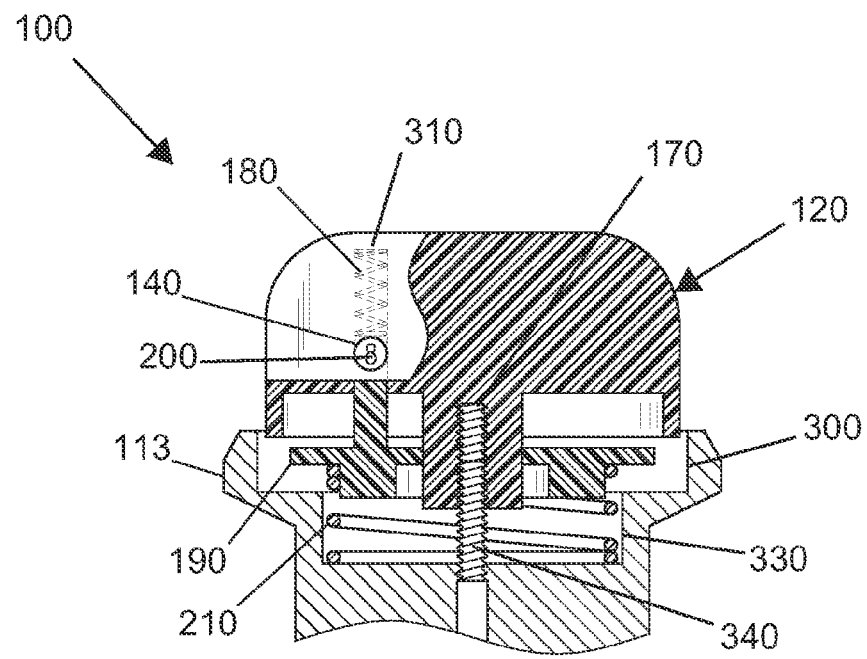
FIG. 12A shows a cross-sectional view in a sagittal plane of an alternate embodiment of a fishing reel drag indicator system in minimum drag position.
Figure 12B:
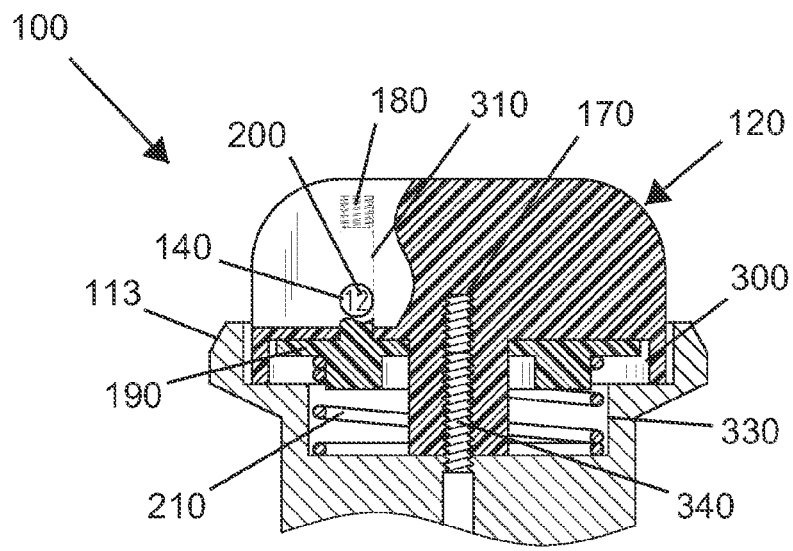
FIG. 12B shows a cross-sectional view in a sagittal plane of an alternate embodiment of a fishing reel drag indicator system in maximum drag position.

Referring now to FIG. 9-12B, the present invention features an alternate embodiment of a fishing reel drag indicator system (100) for numerical quantification of tension applied to fishing line on fishing reels (110) equipped with a drag system. In some embodiments, the fishing reel drag indicator system (100) comprises a drag indicator cap (120) having a planar cap anterior end (121) and a planar cap posterior end (125). In some embodiments, a first notch (130) is located on a first cap anterior end side (122) and a second notch (130) is located on a second cap anterior end side opposed to the first cap anterior end side (122).

In some embodiments, the first notch (130) comprises a first, first flat notch side (131) located on a first plane (132) parallel with the cap posterior end (125). In some embodiments, the first notch (130) comprises a first, second flat notch side (133) located on a second plane (134) perpendicular to the first, first flat notch side (131) and the first plane (132). In some embodiments, the second notch (130) comprises a second, first flat notch side (131) located on a first plane (132) parallel with the cap posterior end (125). In some embodiments, the second notch (130) comprises a second, second flat notch side (133) located on a third plane (350) perpendicular to the second, first flat notch side (131) and the first plane (132). In some embodiments, neither the first notch (130) nor the second notch (130) intersects a central axis (135) located through the drag indicator cap (120) from a cap anterior end center point (123) to the cap posterior end center point (126). In some embodiments, a round indicator window (140) is located on the second flat notch side (133) offset from the central axis (135).

In some embodiments, an annular recess (300) having an annular recess floor (301) is centrally located on the planar cap posterior end (125). In some embodiments, a cylindrical channel (310) is located on the annular recess floor (301). In some embodiments, the round indicator window (140) is fluidly connected to the cylindrical channel (310). In some embodiments, a threaded channel (170) is centrally located on the planar cap posterior end (125).

In some embodiments, the system (100) comprises a gauge spring (180). In some embodiments, the gauge spring (180) is located against and interfaces with a cylindrical channel bottom (311).

In some embodiments, the system (100) comprises a tension indicator (190) having a cylindrical projection (320). In some embodiments, a cylindrical projection bottom edge (321) is located on a round disk top surface (196). In some embodiments, a cylindrical projection top edge (322) is located against and interfaces with the gauge spring (180) in the cylindrical channel (310). In some embodiments, the round disk top surface (196) is located against and interfaces with the annular recess floor (301).

In some embodiments, a series of quantifying numbers (200) is located on a cylindrical projection side wall (323). In some embodiments, at least one of the series of quantifying numbers (200) is viewable through the round indicator window (140).

In some embodiments, the system (100) comprises a main spring (210). In some embodiments, the main spring (210) is located in the annular recess (300). In some embodiments, the main spring (210) is located against and interfaces with the round disk bottom surface (197).

In some embodiments, the system (100) comprises a fishing reel spool anterior end (113) having an annular fishing spool recess (330) centrally located therein. In some embodiments, the fishing reel spool anterior end (113) is located against and interfaces with the main spring (210).

In some embodiments, the fishing reel drag indicator system (100) for numerical quantification of tension applied to fishing line on fishing reels (110) equipped with a drag system is located on a fishing reel spool anterior end (113). In some embodiments, the threaded channel (170) is adapted to screw onto a threaded rod (340) located on the fishing reel anterior end (111).

In some embodiments, upon rotation of the drag indicator cap (120), the drag system is adjusted to a desired level of tension, visually indicated and quantified by the tension indicator (190).

As used herein, the term "about" refers to plus or minus 10% of the referenced number.

The disclosures of the following U.S. Patents are incorporated in their entirety by reference herein: U.S. Pat. No. D 635,637; U.S. Patent Pub. No. 2011/0259988 A1; U.S. Patent Pub. No. 2011/0213570 A1; U.S. Pat. No. 7,357,343; U.S. Pat. No. 6,658,783; U.S. Pat. No. 5,370,329; U.S. Pat. No. 5,219,131; U.S. Pat. No. 4,840,327; and U.S. Pat. No. 4,804,150.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way.

The reference numbers recited in the below claims are solely for ease of examination of this patent application, and are exemplary, and are not intended in any way to limit the scope of the claims to the particular features having the corresponding reference numbers in the drawings.

What is claimed is:

1. A fishing reel drag indicator system (100) for numerical quantification of tension applied to fishing line on fishing reels equipped with a drag system, wherein the fishing reel drag indicator system (100) comprises:
 (a) a drag indicator cap (120) having a hemispherical cap anterior end (121) and a planar cap posterior end (125), wherein a notch (130) is disposed on a cap side (122) of the cap anterior end (121), wherein the notch (130) comprises a first flat notch side (131) disposed on a first plane (132) parallel with the cap posterior end (125), wherein the notch (130) comprises a second flat notch side (133) disposed on a second plane (134) perpendicular to the first flat notch side (131), wherein the notch (130) does not intersect a central axis (135) disposed through the drag indicator cap (120) from a cap anterior end center point (123) to a cap posterior end center point (126), wherein a round indicator window (140) is centrally disposed on the second flat notch side (133), wherein a cylindrical recess (150) having a recess floor (151) is centrally disposed on the planar cap posterior end (125), wherein an annular channel (160) is centrally disposed on the recess floor (151), wherein the round indicator window (140) is fluidly connected to the annular channel (160), wherein a threaded channel (170) is centrally disposed on the recess floor (151);
 (b) a tension indicator (190) having an annular projection (191) centrally disposed on a concave round disk (195), wherein an outer edge of a round disk top surface (196) is disposed against and interfaces with the recess floor (151), wherein the annular projection (191) is slidably received into the annular channel (160), wherein a series of quantifying numbers (200) is disposed on an annular projection side wall (194), wherein at least one of the series of quantifying numbers (200) is viewable through the round indicator window (140); and (c) a gauge spring (180) disposed in the cylindrical recess (150), wherein the gauge spring is disposed against and interfaces with the recess floor (151), wherein the gauge spring (180) is slidably disposed over the annular projection (191), wherein the gauge spring (180) is disposed against and interfaces with a round disk bottom surface (197);

wherein the fishing reel drag indicator system (100) for numerical quantification of tension applied to fishing line on fishing reels (110) equipped with the drag system is disposed on a fishing reel spool anterior end (113), wherein the threaded channel (170) is adapted to screw onto a threaded rod (340) disposed on a fishing reel anterior end (111), wherein upon rotation of the drag indicator cap (120), the drag system is adjusted to a desired level of tension, visually indicated and quantified by the tension indicator (190).

2. A fishing reel drag indicator system (100) for numerical quantification of tension applied to fishing line on fishing reels equipped with a drag system, wherein the fishing reel drag indicator system (100) comprises:

(a) a drag indicator cap (120) having a hemispherical cap anterior end (121) and a planar cap posterior end (125), wherein a notch (130) is disposed on a cap side (122) of the cap anterior end (121), wherein the notch (130) comprises a first flat notch side (131) disposed on a first plane (132) parallel with the cap posterior end (125), wherein the notch (130) comprises a second flat notch side (133) disposed on a second plane (134) perpendicular to the first flat notch side (131), wherein the notch (130) does not intersect a central axis (135) disposed through the drag indicator cap (120) from a cap anterior end center point (123) to a cap posterior end center point (126), wherein a round indicator window (140) is centrally disposed on the second flat notch side (133), wherein a cylindrical recess (150) having a recess floor (151) is centrally disposed on the planar cap posterior end (125), wherein an annular channel (160) is centrally disposed on the recess floor (151), wherein the round indicator window (140) is fluidly connected to the annular channel (160), wherein a threaded channel (170) is centrally disposed on the recess floor (151);

(b) a gauge spring (180) disposed in the annular channel (160), wherein the gauge spring (180) is disposed against and interfaces with an annular channel bottom (161);

(c) a tension indicator (190) having an annular projection (191) centrally disposed on a round disk (195), wherein an annular projection top edge (193) is disposed against and interfaces with the gauge spring (180) in the annular channel (160), wherein a round disk top surface (196) is disposed against and interfaces with the recess floor (151), wherein a series of quantifying numbers (200) are disposed on an annular projection side wall (194), wherein at least one of the series of quantifying numbers (200) is viewable through the round indicator window (140);

(d) a main spring (210), wherein the main spring (210) is disposed in the cylindrical recess (150), wherein the main spring (210) is disposed against and interfaces with a round disk bottom surface (197); and (e) a bottom plate (220) having an aperture (225) centrally disposed therein, wherein the bottom plate (220) is disposed on the cap posterior end (125), wherein a bottom plate top surface (221) is disposed against and interfaces with the main spring (210), wherein the fishing reel drag indicator system (100) for numerical quantification of tension applied to fishing line on fishing reels (110) equipped with the drag system is disposed on a fishing reel spool anterior end (113), wherein the threaded channel (170) is adapted to screw onto a threaded rod (340) disposed on a fishing reel anterior end (111), wherein upon rotation of the drag indicator cap (120), the drag system is adjusted to a desired level of tension, visually indicated and quantified by the tension indicator (190).

\* \* \* \* \*